United States Patent Office 3,489,533
Patented Jan. 13, 1970

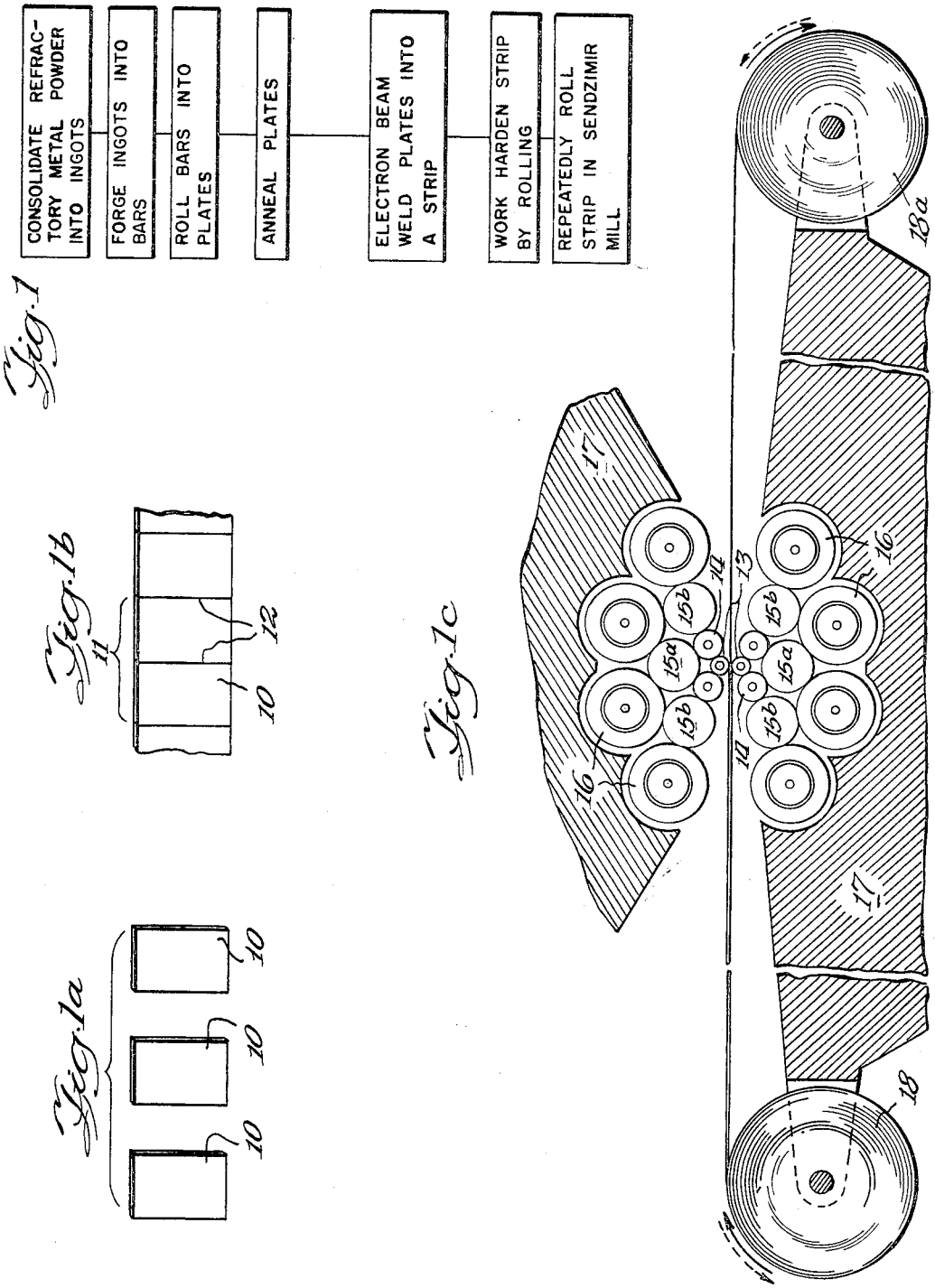

3,489,533
REFRACTORY METAL SHEET
William C. Herchenrider, Lake Forest, and Andrew J. Lelik, Jr., Libertyville, Ill., assignors to Fansteel, Inc., a corporation of New York
Filed Mar. 1, 1967, Ser. No. 619,652
Int. Cl. B21b *1/00;* B21j *1/00;* B23k *27/00*
U.S. Cl. 29—183.5          8 Claims

ABSTRACT OF THE DISCLOSURE

This invention relates to a process for preparing long strips of refractory metal such as tantalum, having an essentially uniform thickness and having essentially uniform properties over each strip so prepared. The strip is prepared in any length desired through the electron beam welding of refractory metal plates, work hardening the resulting strip of plates, and repeatedly rolling the strip under tension using a Sendzimir rolling mill.

BACKGROUND OF THE INVENTION

The refractory metals find commercial use in many applications requiring extreme heat resistance or corrosion resistance. For example, wet-type capacitors, where a can is filled with sulfuric acid, use cans fabricated from sheet tantalum.

Many uses exist for large refractory metal sheets and foil, e.g. space vehcile skins, chemical equipment, vessel liners and furnace shielding. The technology, prior to this invention, however, was limited in its capability to produce such materials, as the characteristics of refractory metals such as their high melting points preclude their fabricability into long sheets or strips. Prior to this invention, such sheet was produced by hammering and rolling an ingot of the refractory metal to produce a sheet of a size which was limited by the size of the original ingot. It has therefore not been previously feasible to prepare very long sheets of refractory metals such as tantalum.

Also, refractory metal sheets of highly uniform thickness have not been previously made.

SUMMARY OF THE INVENTION

The process of this invention produces sheet and foil of cold-workable refractory metals having an essentially unlimited length and a highly uniform thickness. The sheet and foil of this invention typically is prepared in lengths of two hundred or more feet, in widths of up to forty inches or more, and in thickness of as little as 0.06 inch or less with a total variation of thickness of no more than 0.001 inch.

This is accomplished by:

(1) Electron beam welding a plurality of cold-workable, refractory metal plates along entire edges to form a strip comprising said plates, in end-to-end relationship, (2) Work-hardening said strip by rolling it to lengthen it and to reduce its thickness, and (3) Repeatedly rolling said strip in a close-tolerance tension mill while applying sufficient tension to that portion of the strip being rolled whereby said strip acquires an essentially uniform thickness.

The welds between the refractory metal plates extend along the entire edge of each plate where it abuts the edges of the next plate, leaving no unwelded gaps between plates. The metal strip product resulting from this process has a length which is dependent on the number of metal plates which are welded together. Its length therefore has no upper limit, depending only on the capacity of the machinery used, and other practical factors independent of this invention.

Also, the uniformity of thickness of the product produced by this invention is better than the previously-known refractory metal sheet, which previously-known sheet generally has a total variation of thickness of about 0.002 inch.

Electron beam welding has been found to give adequate strength to the strip prepared in the process of this invention, whereas more conventional forms of welding such as arc welding are not suitable.

A cold-workable, refractory metal can be rolled in a conventional manner without cracking from a ¼ inch thick plate to thin metal sheet at a temperature below 1000° F., which temperature is also below the point where substantial oxidation or other contamination of the metal takes place. Examples of cold-workable, refractory metals from which the plates used in this invention can be made are tantalum, columbium, vanadium, and cold-workable alloys which contain large amounts of one or more of these metals, such as an alloy consisting of 9 parts by weight of tantalum and 1 part by weight of tungsten, and an alloy of 99 parts by weight of columbium and 1 part by weight of zirconium.

The thickness of the refractory metal plates is not critical as long as they are not too thick to be firmly welded together throughout the entire thickness of the plates, and as long as the resulting strip is not too thick to be successfully rolled, plates having thicknesses up to about one inch are generally suitable. It is typically preferred to use plates having a thickness of about 0.1 to 0.5 inch.

The work-hardening step can be performed by any type of rolling operation which serves to lengthen the strip and reduce its thickness, strengthening in particular the welded joints of the strip, without subjecting the strip to excessive tension.

The work-hardened strip is then transferred to a close tolerance tension mill such as a Sendzimir-type rolling mill, which is a well-known type of cluster mill. A variety of Sendzimir rolling mills are commercially available from the Waterbury-Farrel Foundry & Machine Co. (Division of Textron, Inc.), Waterbury, Conn.

The welded, rolled strip is subjected to lengthwise tension while being rolled in the close-tolerance tension mill. Desirably, the tension force equals at least one half of the expected yield strength of said strip, and it is preferred for the tension to be the maximum possible without undergoing an excessive risk of breaking the strip, as the tension suppresses "rippling" of the thin strip and undesirable surface effects. It is generally safe to apply a tension of about two thirds of the expected yield strength.

The tension used in this invention is generally a higher percentage of the expected yield strength than has been conventionally used in the past. The improvement in quality of the sheet metal product of this invention over the prior art products prepared from single ingots is accentuated at thicknesses of 0.03 inch and under.

The expected yield strength of a strip can be calculated from the yield strength per square inch of the refractory metal used by multiplying that figure by the minimum cross-sectional area of the strip in square inches. The expected yield strength of the welds after work hardening is comparable to the expected yield strength at other parts of the strip. The expected yield strength of the strip naturally changes as its thickness diminishes through rolling in the Sendzimir mill, and the tension on the strip will usually require downward adjustment during the rolling process.

The strip product of this invention can be coiled on spools for storage. When prepared in accordance with this invention, the strip product is essentially uniform in its physical and electrical properties throughout its entire volume, despite its origin as a strip of welded plates having non-uniform properties at the areas of welding.

Numerous other advantages and features of the present invention will become readily apparent from the following detailed description of the invention and one embodiment thereof, from the claims, and from the accompanying drawings in which each and every detail shown is fully and completely disclosed as part of this specification, in which like reference numerals refer to like parts, and in which:

FIGURE 1 illustrates the steps of a process of this invention;

FIGURE 1a is a plan view of a plurality of rectangular refractory metal plates prior to electron beam welding;

FIGURE 1b is a plan view of a welded strip of the refractory metal plates, showing shading in the weld zones;

FIGURE 1c is a diagrammatic side view of one method of rolling the strip of refractory metal plates in a Sendzimir mill.

A SPECIFIC EMBODIMENT

Referring to FIGURE 1, a cold-workable, refractory metal powder, e.g., tantalum, is consolidated into cylindrical ingots which are generally 5 to 6 inches in diameter by pressing the powder in molds to give it physical integrity, and electron beam melting each molded composite to cause it to flow together into a solid ingot.

The tantalum ingots are then hammer-forged, typically into rectangular bars which are about 6 inches wide and 2 inches thick, and rolled into plates 10 which are, for example, about ¼ inch in thickness, 24 inches in width, and 43 inches in length.

Each plate is then vacuum-annealed to prepare it for further treatment in accordance with this invention.

A number of the plates are electron beam welded along weld seams 12 in an evacuated chamber to form a strip 11, typically about 24 feet in length.

The electron beam is provided by a Hamilton-Standard electron beam welder, the beam area being a circle with a diameter of one-eighth inch, and the speed of beam travel along the weld seams 12, typically ranging between about seven to thirty inches per minute. The technique of electron beam welding is well known and is described in standard texts, as, for example, Bakish and White, Handbook of Electron Beam Welding, John Wiley & Sons, Inc., New York (1964).

Each weld seam is traversed by the electron beam. Although a satisfactory weld can be made with one traverse of the electron beam, one can traverse the weld more than once, for example by traversing each side of the weld seam on opposite sides of the strip. A second traverse of each side of the weld seam has the effect of smoothing the surface.

The two end plates of the resulting strip 11 are optionally tapered in their thickness toward each end so that the ends of each strip have a thickness of about 0.06 to 0.10 inch.

If desired, a leader strip of a metal such as titanium is lap-welded to each end of the welded tantalum strip 11. The titanium leader is generally thin enough so that the lap-welded portion of the titanium leader and the tapered end of strip 11 is no thicker than the main portion of strip 11 itself. The titanium leader is usually the same width as strip 11. The composite of the leader strips and strip 11 is desirably coiled on a spool which is about three feet in diameter, and which may be prepared by coiling stainless steel strip around a spool of smaller diameter.

The titanium leaders are used for the purpose of lengthening the composite strip to permit the rolling under tension of the entire portion of tantalum strip 11, the titanium leaders connecting the tantalum strip with the tension means. This eliminates wastage of tantalum, as the entire tantalum strip is rolled to a sheet of uniform thickness.

Titanium leaders are preferred because they provide superior welds with the cold-workable refractory metals used in strip 11.

The tantalum portion of the composite strip is then repeatedly rolled on, for example, a 4-Hi Reversing Coiling Mill, optionally under low tension (e.g. 1500–5000 lbs.), generally until its thickness is no more than 0.1 inch. After the first pass, the stainless steel strip is removed from the spool to reduce its diameter, the composite strip being coiled on a spool after every pass through the roller. By this process, strip 11, and particularly its welded portions, become work-hardened and able to endure high tension without breaking.

Following this, the coiled strip 11 is processed with a Sendzimir rolling mill at a tension which is continually adjusted to remain at typically about two thirds of the expected yield strength of the strip, the initial tension applied being, for example, about 19,000 pounds.

A typical Sendzimir mill has two small work rolls 13, each supported in a triangular configuration by twin larger intermediate or backing rolls 14. Each set of twin rolls is supported, if desired, by still-larger rolls 15a and 15b, and these can optionally be supported by bearing rolls 16 which are larger yet. Rolls 15b are generally the drive rolls.

A typical feature of the Sendzimir rolling mill is that the rolls are contained in a rigid housing 17 which supports the largest rolls 16 along essentially their entire length, not just at the ends, as is conventional. The housing is generally made from one piece of metal for added rigidity.

A suitable Sendzimir mill is made by the Waterbury-Farrel Company, Model ZR 23, a mill containing twenty rollers as shown in FIGURE 1c, with a work roll diameter of 1.578 inches.

Tantalum strip 11 is fed through the Sendzimir mill by the cooperative action of spools 18 and 18a, which alternatively serve as feed spool and take-up spool. The solid arrows show the respective directions of motion and rotation when spool 18 is dispensing the strip to the Sendzimir mill. When spool 18 has completely dispensed the strip, the operation is reversed, the directions of motion and rotation being shown by the dashed arrows, and spool 18a becomes the dispensing spool. The Sendzimir rolling mill of course also reverses direction.

The required tension is placed on strip 11 in the region of contact with the Sendzimir mill by cooperative pulling action between spools 18 and 18a.

Repetition of the above process causes strip 11 to lengthen and grow thinner until a predetermined, uniform gauge is reached. The strip is then coiled on one of the spools and removed.

Strip 11 is generally passed about 10 to 15 times through the Sendzimir mill, reducing the strip thickness by 5–10 percent on each pass, until it has a thickness of, for example, 0.018 inch±0.0008 inch, and a length of about 640 feet. The width remains uniform.

The titanium leader is removed from both ends of tantalum strip 11, and the finished strip is coiled on a spool for storage.

Although tantalum is specifically used in the above descriptive embodiment, it is to be understood that other cold-workable, refractory metals are equally usable.

It will be readily observed from the foregoing detailed description of the invention and the illustrated embodiments thereof that numerous variations and modifications may be effected without departing from the true spirit and scope of the novel concepts and principles of this invention.

We claim:

1. A cold-workable, refractory metal sheet which has an average thickness of no more than 0.060 inch and which has a variation in thickness of no more than plus or minus 0.001 inch, and which is at least about 24 inches in width.

2. The sheet of claim 1 consisting essentially of tantalum.

3. The sheet of claim 1 consisting essentially of columbium.

4. The sheet of claim 1 in which the thickness is no more than 0.030 inch.

5. The sheet of claim 1 having a length of at least 200 feet.

6. The sheet of claim 1 consisting of a plurality of cold-workable, refractory metal plates welded together end to end to form a unitary structure.

7. The sheet of claim 4 having a width of about 48 inches.

8. A cold-workable, refractory metal sheet having an average thickness of about 0.020 inch, which has a variation in thickness of no more than plus or minus 0.001 inch, which is at least about 40 inches in width and which has a length of about 200 feet.

References Cited

UNITED STATES PATENTS

| | | | |
|---|---|---|---|
| 2,067,192 | 1/1937 | Hudson | 29—480 |
| 2,067,923 | 1/1937 | Hudson | 29—480 |
| 2,099,082 | 11/1937 | Saives | 29—480 |
| 2,214,618 | 9/1940 | Kenyon et al. | 29—480 |
| 2,776,586 | 1/1957 | Sendzimir | 72—242 |
| 3,037,858 | 6/1962 | Weisert | 75—174 |
| 3,282,690 | 11/1966 | Delgrosso et al. | 75—174 |
| 3,303,065 | 2/1967 | Reynolds | 75—174 X |
| 3,391,448 | 7/1968 | Lanphier | 29—480 |

PAUL M. COHEN, Primary Examiner

U.S. Cl. X.R.

29—193, 420.5, 480; 72—241